United States Patent [19]
Drukaroff et al.

[11] 4,385,237
[45] May 24, 1983

[54] OPTICAL DOSIMETER

[75] Inventors: Israel Drukaroff, Lakewood; Robert Fishman, Fair Haven, both of N.J.

[73] Assignee: The United States of America as represented by the Secretary of the Army, Washington, D.C.

[21] Appl. No.: 217,361

[22] Filed: Dec. 17, 1980

[51] Int. Cl.³ .............................................. G01N 21/00
[52] U.S. Cl. ................................... 250/474.1; 350/299
[58] Field of Search ............... 250/472.1, 473.1, 474.1, 250/482.1, 368; 350/299

[56] References Cited

U.S. PATENT DOCUMENTS 2,972,051 2/1961 Baum ................................. 250/474.1
3,591,287 7/1971 Hannis ..................................... 356/51

Primary Examiner—Alfred E. Smith
Assistant Examiner—Carolyn E. Fields
Attorney, Agent, or Firm—Robert P. Gibson; Jeremiah G. Murray; Anne Vachon Dougherty

[57] ABSTRACT

A reflecting optical dosimeter for measuring radiation exposure made of a thin block of radiation sensitive optical material which darkens upon exposure to ionizing and nuclear radiation. The block has an input light pipe at one corner and an output light pipe at another corner, arranged so that the light follows a path including several reflections off of the edges of the block to thereby greatly extend the length of the path. One corner of the block is formed at an angle so that after the light is reflected several times between two opposite edges, it strikes the angled corner and is then reflected between the other two edges before exiting at the output light pipe. The decreased transmission of light from the input to the output pipe is a measure of the radiation dose.

6 Claims, 1 Drawing Figure

U.S. Patent
May 24, 1983
4,385,237
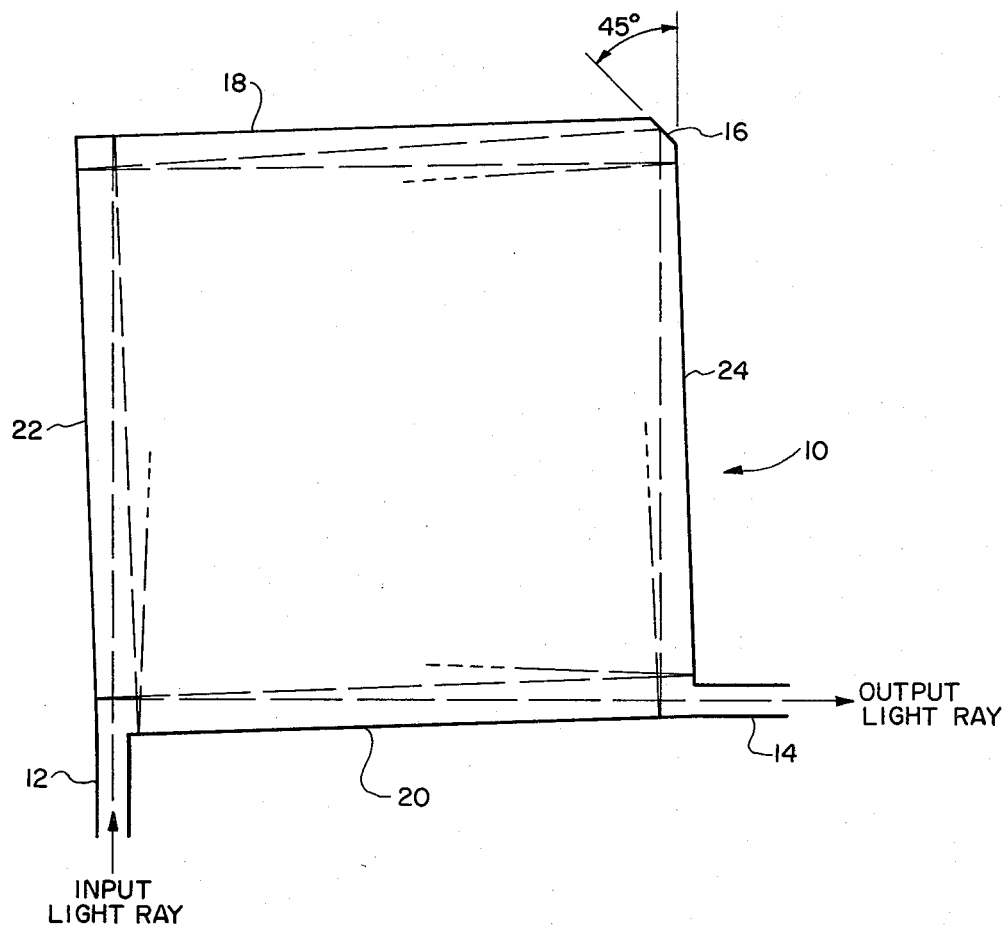

OPTICAL DOSIMETER

The invention described herein may be manufactured and used by or for the Government for governmental purposes without the payment of any royalties thereon or therefor.

BACKGROUND OF THE INVENTION

This invention relates to optical dosimeters, which utilize the darkening induced in various glasses and other optical materials by ionizing and nuclear radiation to measure the radiation dose.

The darkening of optical materials upon exposure to ionizing and nuclear radiation is a well-known phenomenon. Glasses, in particular, have been successfully employed in block form as radiation dosimeters for high dose levels (Klaus Becker, *Solid State Dosimetry*, CRC Press, Cleveland, Ohio, 1973). These materials have usually contained additives such as silver or cobalt to sensitize, control and stabilize the coloration process. However, the poor optical quality and limited size of the glass block dosimeters have restricted the application of these devices.

The use of glass optical fibers as a solution to the problems encountered with bulk glass dosimeters is described in two papers from the Naval Research Laboratory; one on "Glass Fiber-Optic Dosimetry" by Bruce D. Evans on pages 88–93 of Vol. 77 (1976)—Fibers & Integrated Optics, by the Society of Photo-Optical Instrumentation Engineers, Box 1146, Palos Verdes Estates, Calif. 90274; and the other on "The Fiber Optic Dosimeter on the Navigational Technology Satellite" by B. D. Evans et al in IEEE Transactions on Nuclear Science, Vol. NS-25, No. 6, December 1978, pages 1619–1624. These two papers are incorporated by reference. A combination of low intrinsic optical loss and greatly increased optical path length with optical fibers permit enhanced radiation sensitivity of at least one hundred times greater than the conventional glass block dosimeters. In addition, because of the flexibility and small size of the fibers, the sensing element can be confined to a very small volume and is of negligible weight.

However, some crystalline radiation sensitive materials are not readily amenable to drawing into optical fibers.

SUMMARY OF THE INVENTION

An object of the invention is to obtain the advantage of a long light path for more optical materials than is feasible with optical fibers to provide an optical dosimeter.

According to the invention, a reflecting optical dosimeter is a thin block of optical material having an input light pipe at one corner and an output light pipe at another corner, arranged so that the light path includes several reflections off the edges of the block to thereby greatly extend its length. In a preferred embodiment, one corner of the block is formed at an angle so that after the light is reflected several times between two opposite edges, it is then reflected several more times between the other two edges.

BRIEF DESCRIPTION OF THE DRAWING

The single FIGURE is a plan view of a dosimeter according to the invention.

DETAILED DESCRIPTION

The device is a thin block of crystal 10 which is approximately square. There is an input light pipe 12 at the lower left hand edge of the block and an output light pipe out 14 the lower right hand edge as shown in the drawing. The upper right hand edge 16 has been cut at a 45° angle. All edges of the device except at the light pipes have been coated to be reflective. The input light pipe 12 is attached to the main body of the block at an angle which is slightly off the vertical. The output light pipe 14 may be at an angle slightly off the horizontal or completely horizontal.

Light coming in through the input light pipe traverses through the block and is reflected from the top edge 18. It then traverses down through the block and is reflected once again this time from the bottom edge 20. Selection of the proper offset input angle will assure that the returning ray will impinge just beside the input light pipe instead of merely returning to it. The light continues its many near vertical reflections and traverses until on the last traverse it strikes the 45° angle at the upper right corner 16 of the device.

This will reflect the light ray horizontally to the left at an angle just below the horizontal. This initiates a new set of near horizontal traverses between edges 22 and 24 which terminate when the ray exits at the output light pipe.

The multiple reflections produce a very long optical path approximately equal to that obtained with optical fibers. Measurement of total irradiation dose is therefore identical to the procedure for obtaining the total dose with optical fibers.

It is useful to consider the thickness of the device as being one unit and to design the other dimensions in terms of this unit. The distance from left to right in the drawing should be N plus one half (N+½) units long, where N is a whole number. This is to insure that the center of the light beam which reflects off the forty-five degree (45°) angle is centered. The distance from top to bottom in the drawing should be N units. It is desirable that the exit pipe be one and one half (1½) units long. This is because the near horizontal light paths are approximately one half (½) units longer than the vertical paths, whereas the reflecting angles are the same. As a result the vertical reflecting points are very slightly greater than one unit in separation. The extra one half (½) unit of the exit pipe ensures that all of the last reflected beam passes through the pipe.

The device is particularly intended for measurement of total gamma dose. It permits obtaining long optical paths in crystalline radiation sensitive materials not readily amenable to drawing into optical fibers.

This invention makes practical the use of halide crystals as bulk dosimeters by the principle of decreased transmission of light through the crystal as a measure of the total dose of gamma radiation. Previously the very short optical path made it impossible to measure loss of transmission by simple methods. The use of long optical path lengths increases the light attenuation so much that it becomes a practical measurement.

What is claimed is:

1. A dosimeter comprising a thin block of optical material having at least a first pair of parallel edges and including an input light pipe at a small angle from the perpendicular to one edge of said pair and output light path means, so that light entering via the input light pipe is reflected several times back and forth between at least said pair of edges at different points before leaving via the output light path means, said optical material having the property that it becomes darker in response to given radiation, so that the decreased transmission of light along the path from the input light pipe to the output light path means is a measure of the dose of said given radiation.

2. A dosimeter according to claim 1, wherein said block is substantially rectangular forming four edges comprising said first pair and a second pair substantially perpendicular thereto, except that one corner is cut at an angle of substantially 45 degrees to the other edges to form a small fifth edge, wherein said output light path means includes an output light path substantially perpendicular to one edge of said second pair, all five of said edges except at said light pipes being coated to be reflective, so that after said reflection between said first pair of edges, the light is reflected from said fifth edge and then back and forth between said second pair of edges several times before leaving via said output light pipe.

3. A dosimeter according to claim 2, wherein said block is one unit thick, N units between the edges of said pair, M plus one half units between the edges of said second pair, the fifth edge has a length equal to the square root of two units, and said output light pipe is at least one and one half units long.

4. A dosimeter according to claim 3, wherein N is equal to M.

5. A dosimeter according to claim 1, 2, 3 or 4, wherein said given radiation to be measured is gamma radiation.

6. A dosimeter according to claim 5, wherein said optical material is a halide crystalline material.

* * * * *